United States Patent
Choi et al.

(10) Patent No.: US 7,970,910 B2
(45) Date of Patent: Jun. 28, 2011

(54) METHOD OF FORWARDING/SHARING SERVICE AND DEVICE OF ENABLING THE METHOD

(75) Inventors: Hyun Ho Choi, Gyeonggi-do (KR); Tae Soo Kwon, Gyeonggi-do (KR); Tae In Hyon, Gyeonggi-do (KR); Kyung Hun Jang, Gyeonggi-do (KR); In Sun Lee, Seoul (KR); Young Soo Kim, Seoul (KR); Hyo Sun Hwang, Seoul (KR); Hyun Gi Ahn, Incheon (KR)

(73) Assignee: Samsung Electronics Co., Ltd. (KR)

( * ) Notice: Subject to any disclaimer, the term of this patent is extended or adjusted under 35 U.S.C. 154(b) by 253 days.

(21) Appl. No.: 12/014,211

(22) Filed: Jan. 15, 2008

(65) Prior Publication Data
US 2009/0077241 A1 Mar. 19, 2009

(30) Foreign Application Priority Data
Sep. 19, 2007 (KR) .................. 10-2007-0095491

(51) Int. Cl.
*G06F 15/16* (2006.01)
(52) U.S. Cl. .................. 709/227; 370/328; 370/352
(58) Field of Classification Search .................. 709/227
See application file for complete search history.

(56) References Cited

U.S. PATENT DOCUMENTS

| | | | | |
|---|---|---|---|---|
| 5,966,660 A | * | 10/1999 | Jonsson | 455/445 |
| 6,301,348 B1 | * | 10/2001 | Romo et al. | 379/207.12 |
| 7,609,699 B2 | * | 10/2009 | Allen et al. | 370/395.2 |
| 2002/0136199 A1 | * | 9/2002 | Hartmaier | 370/352 |
| 2005/0015496 A1 | | 1/2005 | Guo et al. | |
| 2006/0251008 A1 | * | 11/2006 | Wu et al. | 370/328 |
| 2008/0075067 A1 | * | 3/2008 | Guglielmi et al. | 370/352 |
| 2008/0235745 A1 | * | 9/2008 | Edwards et al. | 725/110 |

FOREIGN PATENT DOCUMENTS

| | | |
|---|---|---|
| KR | 2005-59717 | 6/2005 |
| KR | 2006-65750 | 6/2006 |
| KR | 2006-74369 | 7/2006 |
| WO | WO 2005/120115 A1 | 12/2005 |

* cited by examiner

Primary Examiner — Wing F Chan
Assistant Examiner — Tesfay Yohannes
(74) Attorney, Agent, or Firm — NSIP Law

(57) ABSTRACT

A terminal apparatus for forwarding/sharing a data service is provided. The terminal apparatus for forwarding/sharing the data service includes a service receiver to receive the data service from a service provision apparatus; a connector to perform a connection with a corresponding terminal; and a service forwarding unit to forward the data service to the corresponding terminal via the connection with the corresponding terminal.

21 Claims, 6 Drawing Sheets

METHOD OF FORWARDING/SHARING SERVICE AND DEVICE OF ENABLING THE METHOD

CROSS-REFERENCE TO RELATED APPLICATION

This application claims the benefit of Korean Application No. 2007-95491, filed Sep. 19, 2007 in the Korean Intellectual Property Office, the disclosure of which is incorporated herein by reference.

BACKGROUND OF THE INVENTION

1. Field of the Invention

Aspects of the present invention relate to a method and apparatus to provide a corresponding terminal with a data service provided from at least one of a base station and a service agent, and more particularly, to a method and apparatus to forward/share the data service to/with a corresponding terminal.

2. Description of the Related Art

Recently, users have come to desire receiving various data services while in motion. For example, the users may desire to receive road information and traffic information via navigation apparatuses in cars, to use various multimedia services, and to use wireless Internet services via cellular phones and Personal Digital Assistants (PDAs) while outdoors.

Accordingly, research is actively under way into a communication apparatus and a communication method, including a terminal apparatus to transceive data at high speeds, as well as base stations that enable such transceiving of data, and the like.

Nevertheless, technology is currently not offered for a communication apparatus and a communication method which can forward, to another terminal apparatus, a data service that is provided for one terminal apparatus, or which can share the data service with the another terminal apparatus despite research on emerging communication technologies.

For example, assuming that a user receives a data streaming service for a mobile terminal from a base station located outdoors, when the user enters a home, the user A cannot necessarily continue to receive the data streaming service using the mobile terminal, since the mobile terminal may encounter a power problem, a service quality problem, loss of signal, and the like.

Also, until now, the user actually needed to newly connect a new terminal with the base station to continue to receive the data streaming service that was being received via the mobile terminal using another terminal (such as a television and a computer). Accordingly, the data streaming service that was being received would have to be stopped or interrupted to make the new connection.

Accordingly, a method and apparatus is beneficial to forward/share a data service, which can share the data service with at least one other terminal, or forward the data service to at least one other terminal, which would eliminate having to stop or interrupt the data service being provide for any one terminal.

SUMMARY OF THE INVENTION

Aspects of the present invention provide a terminal apparatus and a method of forwarding/sharing a data service which can forward, to a corresponding terminal, the data service received from a service provision apparatus using a connection with the corresponding terminal according to a user's request.

Aspects of the present invention also provide a terminal apparatus and a method of forwarding/sharing a data service which can improve a user's service satisfaction index by forwarding the data service to a corresponding terminal without interrupting or stopping the data service, or sharing the data service with the corresponding terminal.

Aspects of the present invention also provide a terminal apparatus and a method of forwarding/sharing a data service which can efficiently connect a corresponding terminal with a service provision apparatus by providing connection information of the corresponding terminal to the service provision apparatus in order to connect the corresponding terminal with the service provision apparatus.

Aspects of the present invention also provide a terminal apparatus and a method of forwarding/sharing a data service which can stably forward the data service and efficiently use a radio resource by performing a connection with a corresponding terminal by a peer to peer (P2P) scheme, or performing a communication with the corresponding terminal using a cognitive radio technology.

Aspects of the present invention also provide a service provision apparatus and a service provision method which enable a data service to be efficiently forwarded/shared between a first terminal and a second terminal.

According to an aspect of the present invention, there is provided a terminal apparatus including: a service receiver to receive a data service from a service provision apparatus; a connector to perform a connection with a corresponding terminal; and a service forwarding unit to forward the data service to the corresponding terminal via the connection with the corresponding terminal.

According to an aspect of the present invention, the apparatus further includes a connection information provider to provide connection information of the corresponding terminal to the service provision apparatus in order to connect the corresponding terminal with the service provision apparatus, and a disconnecting unit to disconnect the data service to or from at least one of the corresponding terminal and the service provision apparatus.

According to another aspect of the present invention, there is provided a service provision apparatus including: a service providing unit to provide a data service to a first terminal; a connection information receiver to receive, from the first terminal, connection information of a second terminal connected with the first terminal; and a connection establisher to establish a connection with the second terminal using the connection information of the second terminal.

According to still another aspect of the present invention, there is provided a method of forwarding/sharing a data service, the method including: receiving the data service from a service provision apparatus; performing a connection with a corresponding terminal; and forwarding the data service to the corresponding terminal via the connection with the corresponding terminal.

According to yet another aspect of the present invention, there is provided service provision method including: providing a data service to a first terminal; receiving, from the first terminal, connection information of a second terminal connected with the first terminal; and establishing a connection with the second terminal using the connection information of the second terminal.

According to another aspect of the present invention, a system to seamlessly transfer streaming data includes a source device to wirelessly provide the streaming data; a first device to receive the streaming data and to play the streaming data in real time, and to selectively convey the streaming data in real time; and a second device to receive and play the streaming data that is conveyed through the first device.

According to another aspect of the present invention, an apparatus to selectively convey streaming data includes a receiver to receive the streaming data from a source device; a display to play the received streaming data in real time; and a transmitter to selectively provide the received streaming data to another device in real time based on a request to convey the streaming data from the another device.

According to another aspect of the present invention, a method of selectively conveying streaming data includes receiving the streaming data from a source device; displaying the received streaming data in real time; and selectively providing the received streaming data to another device in real time based on a request from the another device.

According to another aspect of the present invention, a system to seamlessly transfer data service includes a first terminal able to receive the data service; a second terminal able to receive the data service; and a base station to provide the data service to the second terminal via the first terminal by way of the first terminal forwarding the data service, and to provide the data service directly to the second terminal.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the aspects, taken in conjunction with the accompanying drawings of which.

DETAILED DESCRIPTION OF THE EMBODIMENTS

Figure 1:
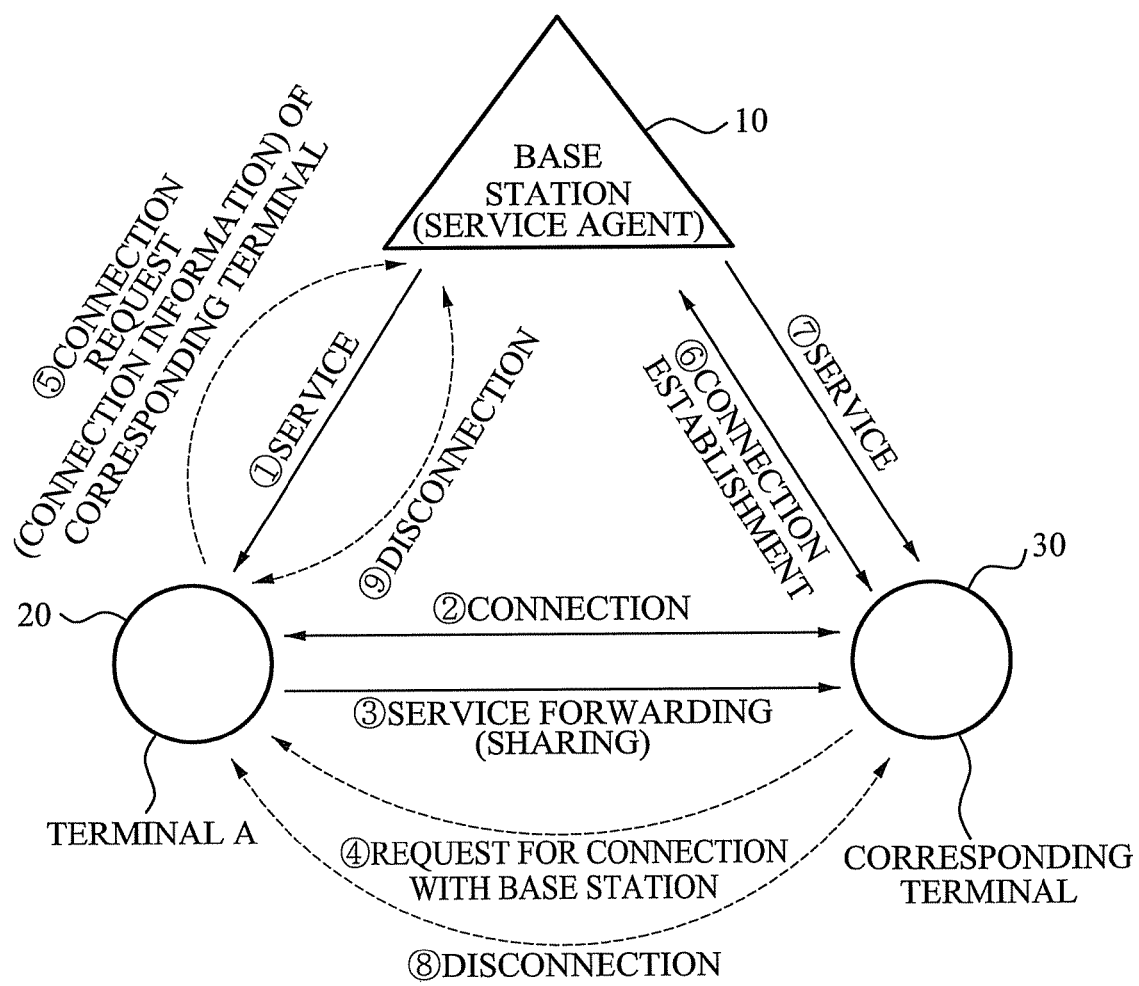
FIG. 1 illustrates a base station, a terminal A, and a corresponding terminal according to an aspect of the present invention.

Reference will now be made in detail to aspects of the present invention, examples of which are illustrated in the accompanying drawings, wherein like reference numerals refer to the like elements throughout. The aspects are described below in order to explain the present invention by referring to the figures.

FIG. 1 illustrates a base station 10, a terminal A 20, and a corresponding terminal 30 according to an aspect of the present invention. Referring to FIG. 1, the base station 10 can be substituted with a service agent, though not required. In this instance, the terminal A 20 can be various communication terminals, including a mobile terminal such as a notebook PC, a Portable Multimedia Player (PMP), a cellular phone, a Personal Digital Assistant (PDA), and a television (TV). Also, the corresponding terminal can include various communication terminals having a communication function, such as a desktop computer, a notebook PC, a PMP, a cellular phone, a PDA, and a TV. In various aspects, the base station 10 (or the service agent) may be a transmission device, such as a wireless broadband base station, an internet service provider (ISP), a server, or other content provider.

The base station 10 provides the terminal A 20 with a service ① (such as a data service). In this instance, the data service can be various communication services, including a data streaming service, and a voice call service. Such data service may include a multimedia stream, video and/or audio stream, streaming broadcast, or the like.

In this instance, the corresponding terminal 30 can request to receive the data service, which is received from the base station 10 by the terminal A 20, simultaneously with the terminal A 20. Conversely, the terminal A 20 can also request the corresponding terminal 30 to receive the data service from the terminal A 20 or the base station 10. Specifically, the terminal A 20 and the corresponding terminal 30 can request a connection of the data service for each other.

When the connection ② of the data service is performed (or made) between the terminal A 20 and the corresponding terminal 30, the terminal A 20 can forward ③ to the corresponding terminal 30, the data service received by the terminal A 20. When the terminal A 20 is receiving the data service, such as the data streaming service, the terminal A 20 can forward the received data streaming service to the corresponding terminal 30. Specifically, since the terminal A 20 and the corresponding terminal 30 can simultaneously receive the data streaming service, the terminal A 20 and the corresponding terminal 30 can share ③ the data streaming service that is received from the base station 10.

For example, assuming that the terminal A 20 is a cellular phone, and that the corresponding terminal 30 is a television, the terminal A 20 receives a relayed sports service (or broadcast game) from the base station 10 as the data streaming service. In this instance, a screen size of the terminal A 20 (the cellular phone) may not be large enough to satisfy a user. In this instance, the user of the terminal A 20 can request a connection to the corresponding terminal 30 (the television), and the terminal A 20 can forward, to the corresponding terminal 30, the relayed sports service received from the base station 10. Accordingly, the user can receive the relayed sports service via the terminal A 20 and the corresponding terminal 30. In other aspects, the vice versa may occur as the user may want to get out of the house, for example.

In this instance, the terminal A 20 and the corresponding terminal 30 can be connected by a peer to peer (P2P) scheme. Specifically, the terminal A 20 and the corresponding terminal 30 can be connected by the P2P scheme and forward/share the data service in real-time.

In performing the connection ② and/or forwarding/sharing (D the connection, for example, the terminal A 20 can select at least one of a radio resource available for a communication with the corresponding terminal, and a communication protocol using a cognitive radio technology. For example, the terminal A 20 can select a frequency resource which is cognitively available, and select any one of various communication protocols. In various aspects, the terminal A 20 can seek available frequency spectrum offering optimal communication links, such as less interference, less traffic, better connection, and the like.

In this instance, the corresponding terminal 30 can make a request ④ to the terminal A 20, that the connection 6 should be established between the corresponding terminal 30 and the base station 10. The terminal A 20, which has received the connection request ④ between the corresponding terminal 30 and the base station 10, can request ⑤ the base station 10 to establish the connection ⑥ between the corresponding terminal 30 and the base station 10. In this instance, the terminal A 20 can provide connection information (D of the corresponding terminal 30 to the base station 10. The connection information can include an Identification (ID) and an Internet Protocol (IP) address of the corresponding terminal 30, a service ID related to the data service of the terminal A 20, and the like.

In this instance, the base station 10 performs the connection ⑥ with the corresponding terminal 30 using the connection information. When the base station 10 and the corresponding terminal 30 are connected, the base station 10 can directly provide the service ⑦ (such as the data service) to the corresponding terminal 30. Specifically, since the base station 10 according to an aspect of the present invention can provide the data service to the corresponding terminal 30 via the terminal A 20 (the service forwarding ③), and provide the data service via the direct connection ⑦ with the corresponding terminal 30, a user's service satisfaction index can be improved.

In this instance, the terminal A 20 and the corresponding terminal 30 can respectively request a disconnection ⑧ of the terminal A 20 and the corresponding terminal 30. Also, the terminal A 20 can request, to the base station 10, a disconnection ⑨ of the terminal A 20 and the base station 10. In this instance, the terminal A 20 and the corresponding terminal 30 can be disconnected ⑧, and the terminal A 10 and the base station 10 can be disconnected ⑨.

Figure 2:
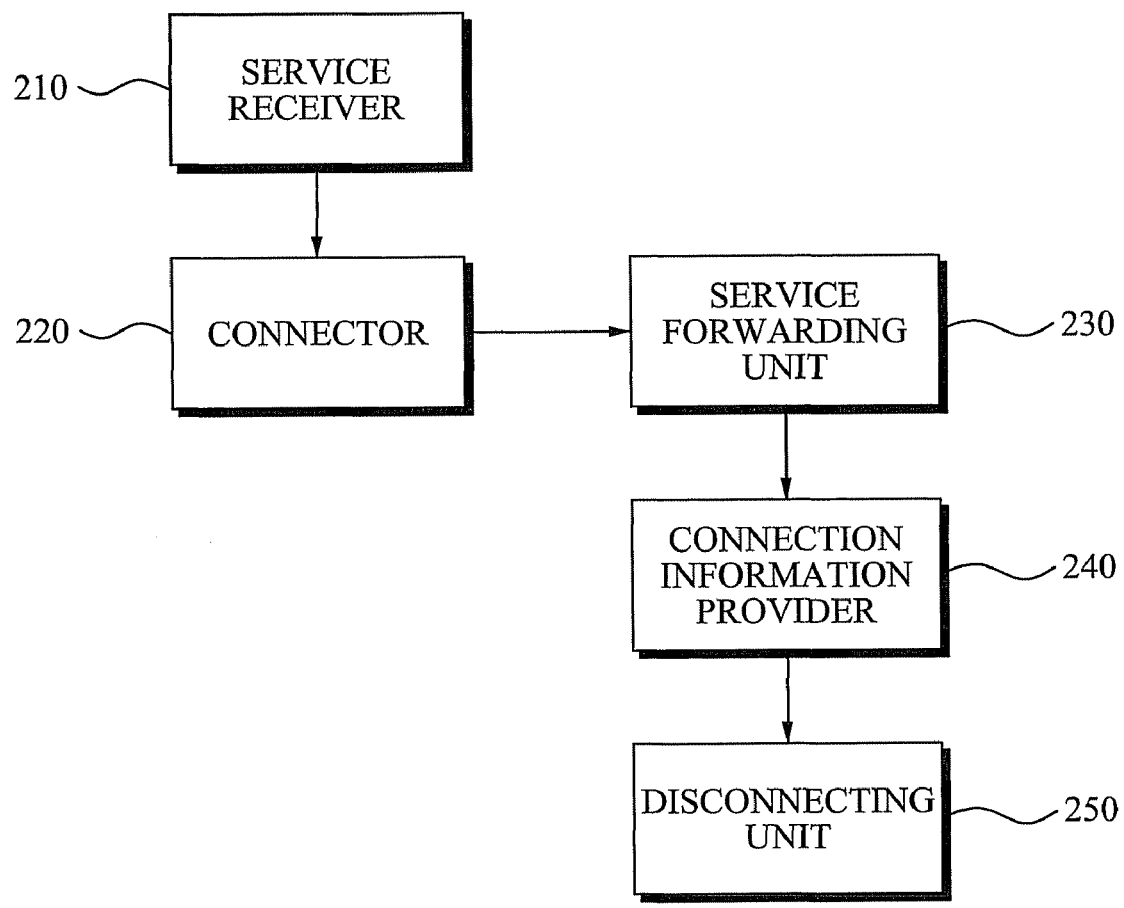
FIG. 2 is a block diagram illustrating a terminal apparatus according to an aspect of the present invention.

FIG. 2 is a block diagram illustrating a terminal apparatus 200 according to an aspect of the present invention. Referring to FIG. 2, the terminal apparatus 200 includes a service receiver 210, a connector 220, a service forwarding unit 230, a connection information provider 240, and a disconnecting unit 250. In an aspect of the present invention, the terminal apparatus 200 may be the terminal A or the corresponding terminal of FIG. 1.

The service receiver 210 receives a data service from a service provision apparatus (which may be the base agent 10 of FIG. 1). In this instance, the data service includes at least one of a data streaming service and a voice call service, for example. Also, the connector 220 performs a connection with a corresponding terminal (such as the corresponding terminal 30 of FIG. 1). In this instance, the connector 220 performs the connection with the corresponding terminal according to a connection request of at least one of a user of the corresponding terminal and a user of the terminal apparatus 200. In this instance, the connector 220 performs the connection with the corresponding terminal by a peer to peer (P2P) scheme. Specifically, aspects of the present invention can provide users with a seamless (or uninterrupted) data service by performing the connection with the corresponding terminal by the P2P scheme, and forwarding/sharing the data service.

In this instance, the connector 220 can select a radio resource available for a communication with the corresponding terminal using a cognitive radio technology. Specifically, since the available radio resource is limited, the connector 220 can select the best available radio resource based on a time and a place (or a network) using the cognitive radio technology. In this instance, the radio resource can include a frequency resource, a space resource, a time resource, a code resource, and the like. In various aspects, the best available radio resource may vary depending on availability, traffic volume, interference, capacity, and the like of the frequency resource, the space resource, the time resource, the code resource, and the like.

Also, the connector 220 can select a communication protocol available for the communication with the corresponding terminal. Specifically, the connector 220 can select the communication protocol appropriate for the time and the place without interference with data of another network. Also, the service forwarding unit 230 forwards the data service to the corresponding terminal via the connection with the corresponding terminal. For example, assuming that the service receiver 210 receives a movie service from a service provision apparatus, the service forwarding unit 230 can forward to the corresponding terminal, the movie service received from the service provision apparatus via the connection with the corresponding terminal. In this instance, the service forwarding unit 230 can forward the data service to the corresponding terminal by the P2P scheme. Also, when the connector 220 selects at least one of the available radio resource and the available communication protocol, for example, the service forwarding unit 230 can forward the data service to the corresponding terminal using at least one of the selected radio resource and the selected communication protocol, for example.

Also, the connection information provider 240 provides connection information of the corresponding terminal to the service provision apparatus in order to connect the corresponding terminal with the service provision apparatus. In this instance, the connection information can include an ID and an IP address of the corresponding terminal, and an ID of the data service. The service provision apparatus, which has received the connection information from the connection information provider 240, establishes a connection between the corresponding terminal and the service provision apparatus. In this instance, the connection between the corresponding terminal and the service provision apparatus can be performed via any one of a wireless connection scheme and a wired connection scheme, or some combination thereof.

When the connection is performed between the corresponding terminal and the service provision apparatus, the service provision apparatus can provide the data service to the corresponding terminal. Specifically, the corresponding terminal can receive the data service from the service forwarding unit 230, and directly receive the data service from the service provision apparatus. Also, the disconnecting unit 250 disconnects at least one of the corresponding terminal and the service provision apparatus (or the data service thereof). Specifically, when the corresponding terminal and the service provision apparatus are connected, the terminal apparatus can eliminate having to receive the data service from the service provision apparatus, and having to forward the data service to the corresponding terminal. In this instance, the disconnecting unit 250 can request the disconnection of the data service to or from at least one of the corresponding terminal and the service provision apparatus.

Although described in term of individual units, all or some of the service receiver 210, the connector 220, the service forwarding unit 230, the connection information provider 240, and the disconnecting unit 250 may be embodied in a single unit having their functionalities.

Figure 3:
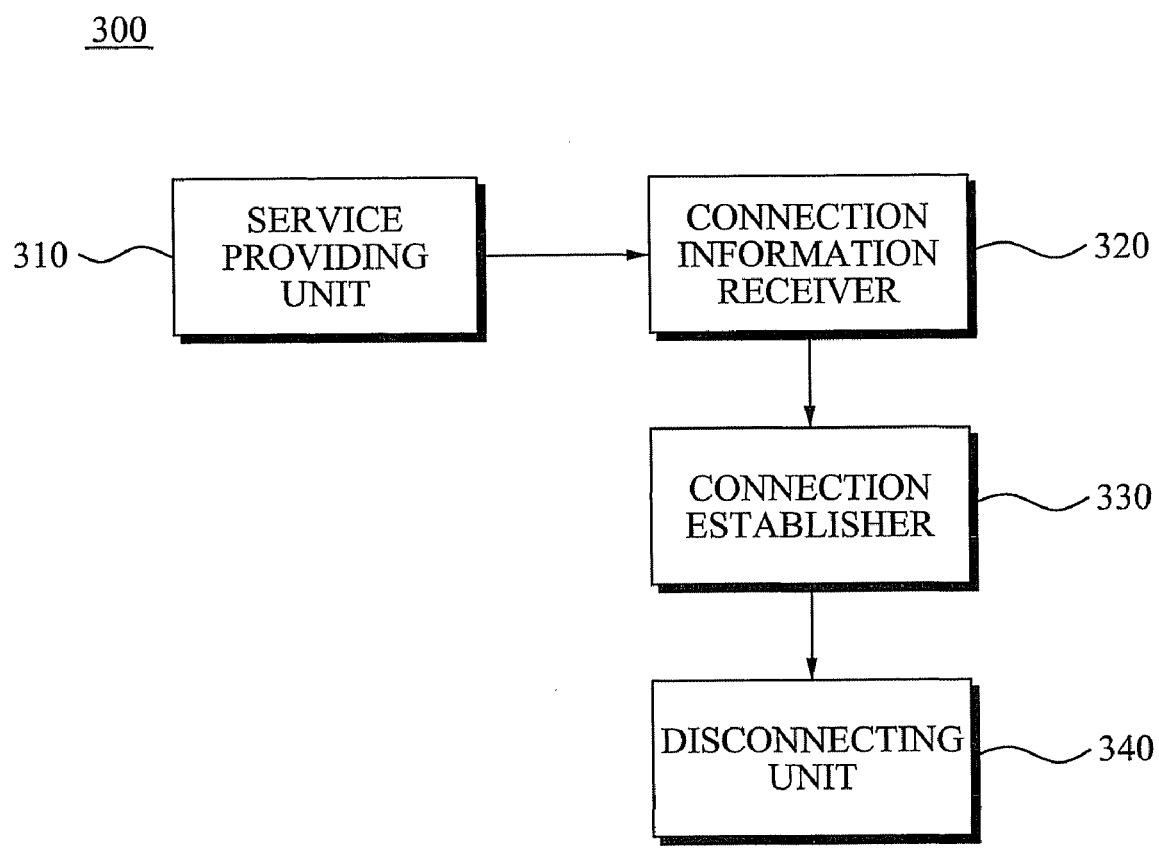
FIG. 3 is a block diagram illustrating a service provision apparatus according to an aspect of the present invention.

FIG. 3 is a block diagram illustrating a service provision apparatus 300 according to an aspect of the present invention. Referring to FIG. 3, the service provision apparatus 300 includes a service providing unit 310, a connection information receiver 320, a connection establisher 330, and a disconnecting unit 340. In an aspect of the present invention, the service provision apparatus 300 may be the base station 10 of FIG. 1.

The service providing unit 310 provides a data service to a first terminal (such as the terminal A 20 of FIG. 1). In this instance, as described above, the data service can include various services including a data streaming service and a voice call service. Also, the connection information receiver 320 receives, from the first terminal, connection information of a second terminal (such as the corresponding terminal 30 of FIG. 1) connected (or connectable) with the first terminal. In this instance, the connection information can include an ID and an IP address of the second terminal, an ID of the data service, and the like. Also, the first terminal and the second terminal can be connected by a P2P scheme.

Also, the connection establisher 330 establishes a connection with the second terminal using the connection information of the second terminal. In this instance, the connection with the second terminal can be established by any one of a wired connection scheme and a wireless connection scheme, or a combination thereof. In this instance, the connection establisher 330 establishes the connection with the second terminal according to a connection request received from the first terminal. In this instance, the service providing unit 310 provides the data service to the second terminal via the connection with the second terminal when the connection is established between the service provision apparatus and the second terminal. Specifically, the second terminal can receive the data service from the first terminal via the connection with the first terminal, and directly receive the data service from the service providing unit 310.

Also, the disconnecting unit 340 disconnects the first terminal when the connection is established between the service provision apparatus and the second terminal. Specifically, the disconnecting unit 340 disconnects the first terminal when the first terminal does not desire to receive the data service, or the first terminal does not have to forward the data service to the second terminal.

Although described in term of individual units, all or some of the service providing unit 310, the connection information receiver 320, the connection establisher 330, and the disconnecting unit 340 may be embodied in a single unit having their functionalities.

Figure 4:
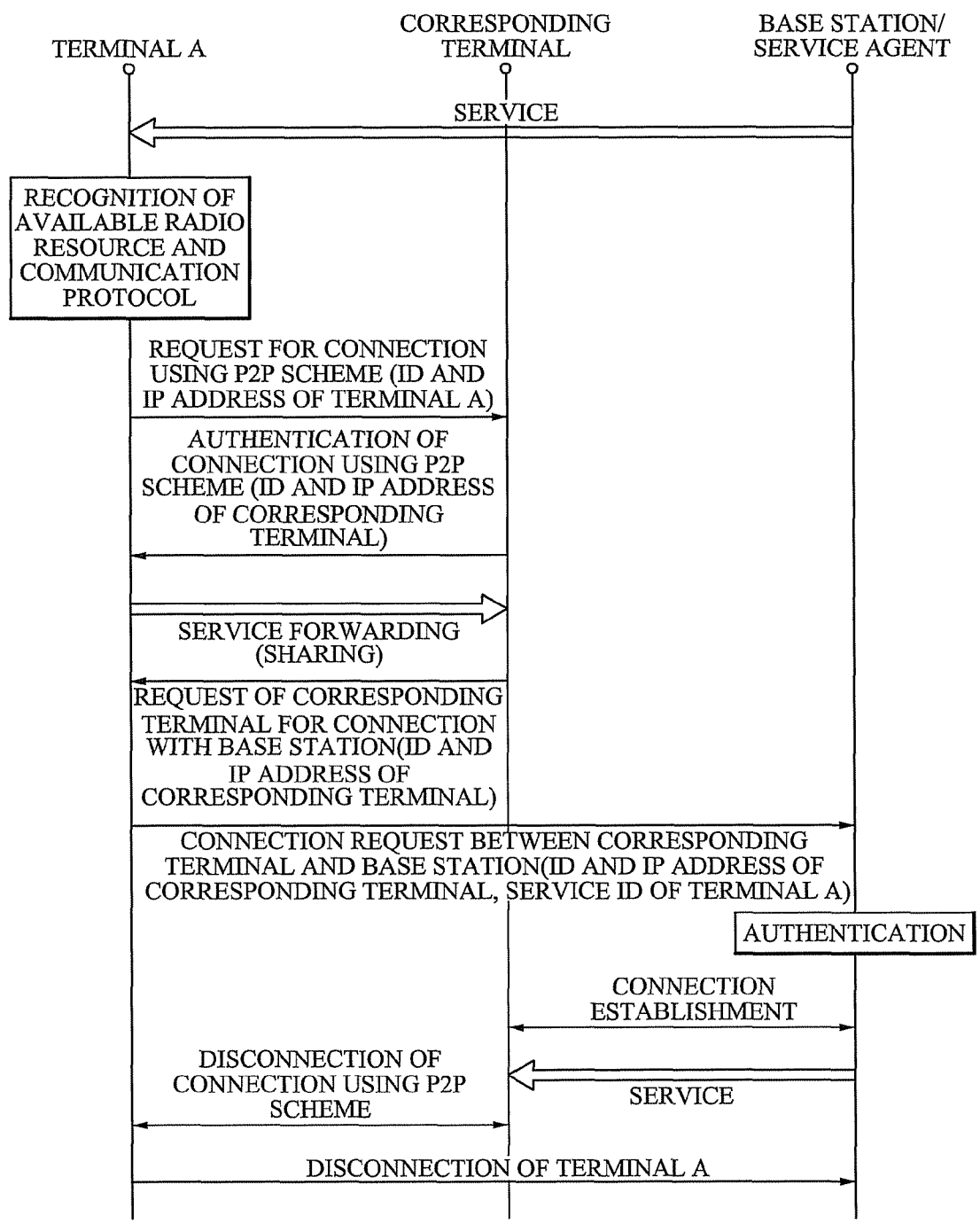
FIG. 4 is a flowchart illustrating a flow of data among a terminal A, a corresponding terminal, and a base station according to an aspect of the present invention.

FIG. 4 is a flowchart illustrating a flow of data among a terminal A, a corresponding terminal, and a base station/service agent according to an aspect of the present invention. Referring to FIG. 4, the base station/service agent provides a data service to terminal A. In this instance, the terminal A can recognize an available radio resource and a communication protocol using a cognitive radio technology.

The terminal A communicates with the corresponding terminal using the recognized radio resource and the recognized communication protocol. Specifically, the terminal A makes a request to the corresponding terminal for a connection with the corresponding terminal by a P2P scheme. In this instance, the terminal A forwards an ID and an IP address of the terminal A to the corresponding terminal. Also, the corresponding terminal authenticates a connection request of terminal A, and is connected with the terminal A by the P2P scheme using the ID and the IP address received from terminal A.

When the terminal A and the corresponding terminal are connected by the P2P scheme, the terminal A forwards the data service to the corresponding terminal, or shares the data service with the corresponding terminal. In this instance, the corresponding terminal makes a request to terminal A for the connection between the corresponding terminal and the base station. In this instance, the corresponding terminal forwards an ID and an IP address of the corresponding terminal to terminal A.

Terminal A makes a request to the base station for the base station to connect with the corresponding terminal. In this instance, the terminal A forwards connection information including the ID and the IP address of the corresponding terminal, and a service ID, to the base station. In this instance, the base station performs an authentication procedure for the corresponding terminal, and when the authentication procedure is completed, the base station establishes the connection with the corresponding terminal.

When the connection is established between the corresponding terminal and the base station, the base station provides the data service to the corresponding terminal. In this instance, the base station selectively provides or does not provide the data service to terminal A. When it is determined that the connection between the terminal A and the corresponding terminal is unnecessary, the terminal A and the corresponding terminal connected by the P2P scheme are disconnected. Also, when it is determined that the connection between the terminal A and the base station is unnecessary, the terminal A and the base station are also disconnected. Accordingly, it is understood that the data service provided to the terminal A is seamlessly forwarded to the corresponding terminal.

Figure 5:
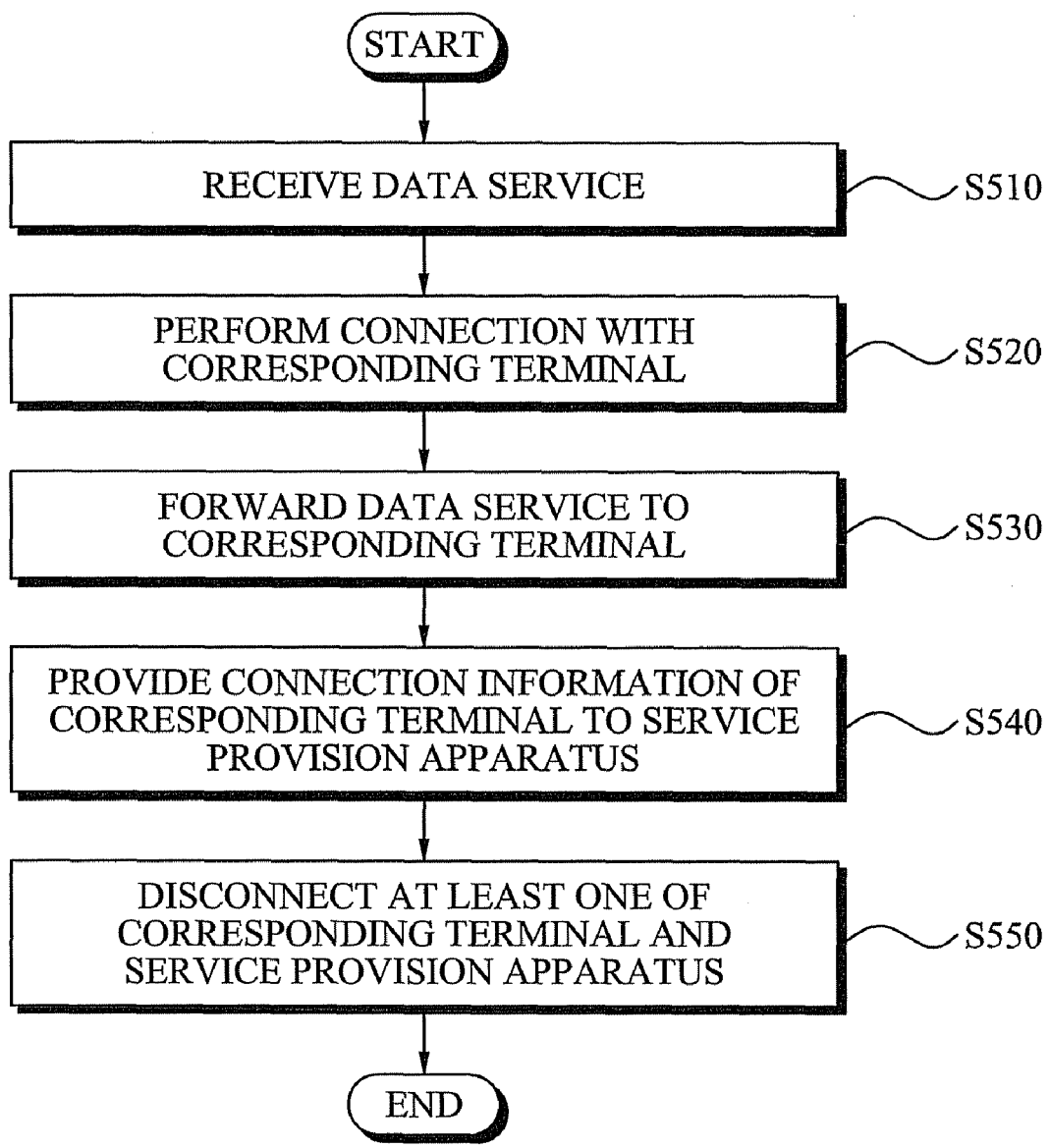
FIG. 5 is a flowchart illustrating a method of forwarding/sharing a data service according to an aspect of the present invention.

FIG. 5 is a flowchart illustrating a method of forwarding/sharing a data service according to an aspect of the present invention. Referring to FIG. 5, the method of forwarding/sharing the data service receives the data service from a service provision apparatus in operation S510. Also, the method of forwarding/sharing the data service performs a connection with a corresponding terminal in operation S520. In this instance, the performing of the connection in operation S520 includes making the connection (or connecting) with the corresponding terminal by a P2P scheme. Also, the performing of the connection in operation S520 includes making the connection (or connecting) with the corresponding terminal according to a connection request of at least one of the corresponding terminal and a user. In this instance, the performing of the connection in operation S520 includes making the connection (or connecting) with the corresponding terminal by selecting at least one of a radio resource available for a communication with the corresponding terminal, and a communication protocol using a cognitive radio technology.

Also, the method of forwarding/sharing the data service includes forwarding the data service to the corresponding terminal via the connection with the corresponding terminal in operation S530. Also, in operation S540, the method of forwarding/sharing the data service provides connection information of the corresponding terminal to the service provision apparatus in order to connect the corresponding terminal with the service provision apparatus. Also, the method of forwarding/sharing the data service disconnects at least one of the corresponding terminal and the service provision apparatus in operation S550.

Figure 6:
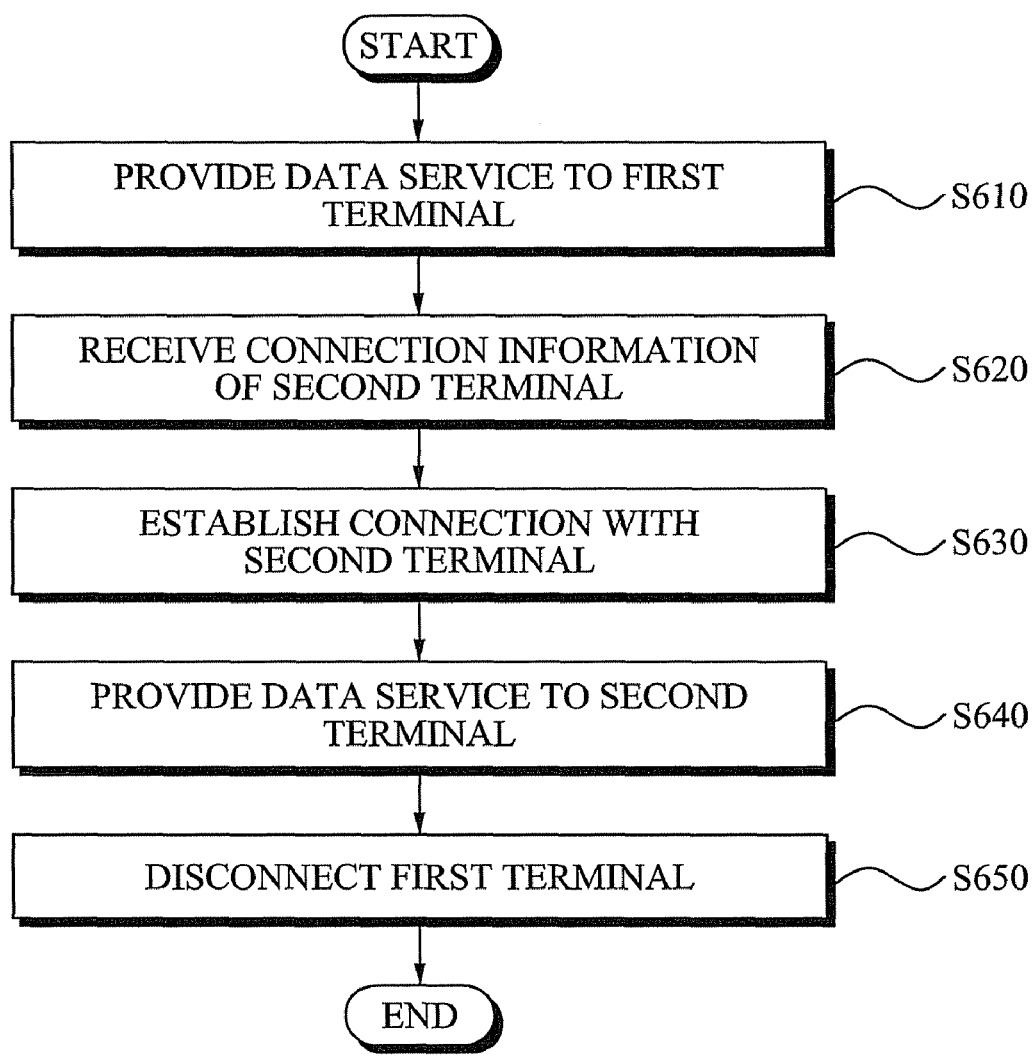
FIG. 6 is a flowchart illustrating a service provision method according to an aspect of the present invention.

FIG. 6 is a flowchart illustrating a service provision method according to an aspect of the present invention. The service provision method provides a data service to a first terminal in operation S610. Also, the service provision method receives, from the first terminal, connection information of a second terminal connected with the first terminal in operation S620. In this instance, the first terminal and the second terminal are connected by a P2P scheme.

Also, the service provision method establishes a connection with the second terminal using the connection information of the second terminal in operation S630. In this instance, the establishing of the connection in operation S630 includes establishing the connection (or connecting) with the second terminal according to a connection request received from the first terminal.

Also, the service provision method provides the data service to the second terminal via the connection with the second terminal in operation S640. Also, in operation S650, the service provision method disconnects the first terminal when the connection with the second terminal is established.

As some details, which are not illustrated in FIGS. 5 and 6 were previously described with reference to FIGS. 1 through 4, a detailed description of such redundant details is omitted herein.

The method of forwarding/sharing the data service according to the above-described aspects of the present invention may be embodied in computer-readable media that include program instructions to implement the various operations by a computer. The media may also include, alone or in combination with the program instructions, data files, data structures, and the like. The media and program instructions may be those specially designed and constructed for the purposes of aspects of the present invention, or they may be of the kind well-known and available to those having skill in the computer software arts. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described aspects of the present invention.

According to an aspect the present invention, there is provided a terminal apparatus and a method of forwarding/sharing a data service which can forward, to a corresponding terminal, the data service received from a service provision apparatus using a connection with the corresponding terminal according to a user's request.

Also, according to an aspect the present invention, there is provided a terminal apparatus and a method of forwarding/sharing a data service which can improve a user's service satisfaction index by forwarding the data service to a corresponding terminal without stopping or interrupting the data service, or by sharing the data service with the corresponding terminal.

Also, according to an aspect the present invention, there is provided a terminal apparatus and a method of forwarding/sharing a data service which can efficiently connect a corresponding terminal with a service provision apparatus by providing connection information of the corresponding terminal to the service provision apparatus in order to connect the corresponding terminal with the service provision apparatus.

Also, according to an aspect the present invention, there is provided a terminal apparatus and a method of forwarding/sharing a data service which can stably forward the data service and efficiently use a radio resource by performing a connection with a corresponding terminal by a P2P scheme, or performing a communication with the corresponding terminal using a cognitive radio technology.

In various aspects, at least one of refers to alternatives chosen from available elements so as to include one or more of the elements. For example, if the elements available include elements X, Y, and Z, at least one of refers to X, Y, Z, or any combination thereof.

Also, according to an aspect the present invention, there is provided a service provision apparatus and a service provision method which enable a data service to be efficiently forwarded/shared between a first terminal and a second terminal.

Although a few aspects of the present invention have been shown and described, it would be appreciated by those skilled in the art that changes may be made to the aspects without departing from the principles and spirit of the invention, the scope of which is defined in the claims and their equivalents.

What is claimed is:

1. A terminal apparatus, comprising:
   a service receiver configured to receive a data service from a service provision apparatus;
   a connector configured to perform a connection with a corresponding terminal; and
   a service forwarding unit configured to forward the data service to the corresponding terminal via the connection with the corresponding terminal,
   wherein the connector is further configured to perform the connection with the corresponding terminal according to a connection request of at least one of the corresponding terminal and a user, and
   wherein the connector is further configured to perform the connection with the corresponding terminal by selecting a communication protocol using a cognitive radio technology.

2. The apparatus of claim 1, further comprising a connection information provider configured to provide connection information of the corresponding terminal to the service provision apparatus in order to connect the corresponding terminal with the service provision apparatus.

3. The apparatus of claim 1, further comprising a disconnecting unit configured to disconnect the data service to or from at least one of the corresponding terminal and the service provision apparatus.

4. The apparatus of claim 1, wherein the connector is configured to perform the connection with the corresponding terminal by a peer to peer (P2P) scheme.

5. The apparatus of claim 1, wherein the data service includes at least one of a data streaming service and a voice call service.

6. A service provision apparatus, comprising:
   a service providing unit configured to provide a data service to a first terminal;
   a connection information receiver configured to receive, from the first terminal, connection information of a second terminal connected with the first terminal; and
   a connection establisher configured to establish a connection with the second terminal using the connection information of the second terminal,
   wherein the connection establisher is further configured to establish the connection with the second terminal according to a connection request received from the first terminal, and
   wherein the first and second terminals are communicatively connected before the second terminal is connected to the base station.

7. The apparatus of claim 6, further comprising a disconnecting unit configured to disconnect the first terminal when the connection with the second terminal is established.

8. The apparatus of claim 6, wherein the service providing unit is configured to provide the data service to the second terminal via the connection with the second terminal.

9. The apparatus of claim 6, wherein the first terminal and the second terminal are connected by a peer to peer (P2P) scheme.

10. A method of forwarding/sharing a service, the method comprising:

receiving a data service from a service provision apparatus;

performing a connection with a corresponding terminal; and forwarding the data service to the corresponding terminal via the connection with the corresponding terminal, wherein the performing of the connection comprises making the connection with the corresponding terminal according to a connection request of at least one of the corresponding terminal and a user, and wherein the performing of the connection further comprises making the connection with the corresponding terminal by selecting a communication protocol using a cognitive radio technology.

11. The method of claim 10, further comprising providing connection information of the corresponding terminal to the service provision apparatus in order to connect the corresponding terminal with the service provision apparatus.

12. The method of claim 10, further comprising disconnecting the data service to or from at least one of the corresponding terminal and the service provision apparatus.

13. The method of claim 10, wherein the performing of the connection includes making the connection with the corresponding terminal by a peer to peer (P2P) scheme.

14. A service provision method, comprising:

providing a data service to a first terminal;

receiving, from the first terminal, connection information of a second terminal connected with the first terminal; and establishing a connection with the second terminal using the connection information of the second terminal, wherein the establishing the connection comprises establishing the connection with the second terminal according to a connection request received from the first terminal, and wherein the first and second terminals are communicatively connected before the receiving of the connection information.

15. The method of claim 14, further comprising disconnecting the first terminal when the connection with the second terminal is established.

16. The method of claim 14, further comprising providing the data service to the second terminal via the connection with the second terminal.

17. The method of claim 14, wherein the first terminal and the second terminal are connected by a peer to peer (P2P) scheme.

18. A non-transitory computer-readable recording medium storing a program to cause a host to implement the method according to claim 10.

19. An apparatus to selectively convey streaming data, the apparatus comprising:

a receiver configured to receive the streaming data from a source device;

a display configured to play the received streaming data in real time; and a transmitter configured to selectively provide the received streaming data to another device in real time based on a request to convey the streaming data from the another device, wherein the apparatus is configured to provide a connection request to establish a connection with the another device according to the connection request, and wherein the source device and the another device are communicatively connected before the another device is connected to the apparatus.

20. The apparatus of claim 19, wherein the apparatus is configured to provide the source device with a request from the another device to provide the streaming data so that the source device provides the streaming data directly to the second device, and without the apparatus providing the streaming data.

21. A method of selectively conveying streaming data, the method comprising:

receiving the streaming data from a source device;

displaying the received streaming data in real time;

selectively providing the received streaming data to another device in real time based on a request from the another device; and providing a connection request for establishing a connection with the another device, according to the connection request, wherein the source device and the another device are communicatively connected before the request from the another device is received.

* * * * *